United States Patent [19]

Bird

[11] 4,008,421
[45] Feb. 15, 1977

[54] METHODS AND APPARATUS FOR SPEED-CONTROL OF INDUCTION MOTORS

[75] Inventor: Brian Michael Bird, Bristol, England

[73] Assignee: National Research Development Corporation, England

[22] Filed: Jan. 31, 1975

[21] Appl. No.: 546,113

[30] Foreign Application Priority Data

Feb. 1, 1974 United Kingdom ............... 4768/74

[52] U.S. Cl. ............................... 318/171; 318/230; 318/231; 321/4; 321/6

[51] Int. Cl.$^2$ ........................................ H02P 5/34

[58] Field of Search .......... 318/171, 227, 230, 231; 321/4, 6

[56] References Cited

UNITED STATES PATENTS

| | | | |
|---|---|---|---|
| 3,353,081 | 11/1967 | Stemmler ...................... | 318/227 X |
| 3,387,195 | 6/1968 | Piccand et al. ..................... | 318/227 |
| 3,470,447 | 9/1969 | Gyugyi et al. ................. | 318/227 X |
| 3,493,838 | 2/1970 | Gyugyi et al. ................. | 318/227 X |
| 3,703,672 | 11/1972 | Bird et al. ..................... | 318/231 X |

Primary Examiner—Gene Z. Rubinson
Attorney, Agent, or Firm—Larson, Taylor and Hinds

[57] ABSTRACT

A method of energizing a single-, three-, or poly-phase A.C. motor for continuously-variable speed control from a fixed-frequency supply of corresponding phase. Each phase is modulated by a continuously-variable modulation wave of sub-supply frequency to provide two continuously-variable sideband frequencies, either of which can be used to supply the motor. The modulation wave is sampled in each cycle of the A.C. supply and a full-wave rectified resultant modulation wave compared with a cosine wave of supply frequency. Each phase is gated by solid-state switch means for current flow from amplitude equality to next-following cosine zero. Optionally, secondary modulation, by a square wave of supply frequency, is used.

10 Claims, 11 Drawing Figures

PULSE AMPLIFICATION AND ISOLATION

METHODS AND APPARATUS FOR SPEED-CONTROL OF INDUCTION MOTORS

This invention relates to methods and to apparatus for speed control of induction motors and synchronous machines. Particularly, the invention is concerned with controlled alternating-current supply arrangements, for single-phase, three-phase or polyphase motors whereby the motor running speed is controlled in a continuously variable manner.

The object of one form of the invention is to provide an improved method of energising an alternating-current induction motor winding.

The object of another form of the invention is to provide improved apparatus, including an alternating-current motor winding and power supply circuitry therefor, enabling the motor to be run at continuously-variable speed, in either sense of rotation.

A method of power supply to an induction motor has earlier been proposed whereby the alternating current of supply frequency is modulated by a rectangular modulation wave of controlled variable frequency to provide side band current waves, of frequency displaced from the original supply frequency, by which the motor is energised and controlled stepwise in speed according to the side band frequency chosen. Such a modulation process produces two side-band waves but no carrier component in the modulated output.

It would be possible, by a method of supply current modulation using a near-sinusoidal modulation wave, to produce two side-band waves and also a carrier component at the original supply frequency.

The present invention provides a supply current modulation method, using a near-sinusoidal wave, which produces two side-band waves of controlled frequency but no carrier component at the supply frequency.

Apparatus used in the induction motor power supply method first described above comprises a transformer and six bi-directional switches, or a delta-connected motor winding and twelve bi-directional switches, for three-phase control.

Apparatus used in one form of the present invention similarly comprises six bi-directional switches for three-phase control, but does not require a separate transformer.

Mathematical Analysis

A single-phase, sine-wave voltage mains supply can be represented as:

$$A_c = V_c \sin(\omega_c t),$$

where $V_c$ is the voltage amplitude of the supply. If this sinusoidal wave is used as a carrier wave, which is amplitude-modulated by a sine wave, of amplitude $A_m$, and of frequency $\omega_m$, the modulation process can be expressed as:

$$A_c \times A_m = V_c \sin(\omega_c t) \times M \sin(\omega_m t)$$
$$= M.V_c.\tfrac{1}{2}\{\cos(\omega_c - \omega_m)t - \cos(\omega_c + \omega_m)t\},$$

where $M$ is a coefficient between zero and unity. This modulation process is used for the power supply method referred to. The products of the modulation procedure are thus seen to contain two components, one of frequency $(\omega_c - \omega_m)$. The peak amplitude of both of these components is $M \times V_c/2$. $M$ is therefore known as the modulation index.

Now, let the expressions for $A_c$ and $A_m$ include arbitrary phase angles $\theta_c$ and $\theta_m$, respectively. The modulation procedure now becomes:

$$A_c \times A_m = V_c \sin(\omega_c t \times \theta_c) \times M \sin(\omega_m t + \theta_m)$$
$$= M.V_c.\tfrac{1}{2}\{\cos(\omega_c - \omega_m)t + (\theta_c - \theta_m)\} - \cos\{(\omega_c + \omega_m)t + (\theta_c + \theta_m)\}$$

A number of modulation processes will be considered more particularly, as set out below;

Single-phase fixed frequency to provide a single-phase variable frequency

A single-phase voltage supply can be modulated by a single-phase modulating wave of variable frequency to obtain two sidebands, either of which can be used to provide a single-phase source of variable frequency for a single-phase a.c. machine.

Single-phase fixed frequency to provide a polyphase variable frequency

A single-phase voltage source can be converted to a polyphase voltage source of variable frequency by modulating the carrier by more than one modulating signal, with appropriate phase displacement between the various modulating signals. For example, a phree-phase source can be obtained from a single-phase carrier by modulating the carrier by $M \sin(\omega_m t)$, $M \sin(\omega_m t - (2\pi/3))$ and $M \sin(\omega_m t - (4\pi/3))$. This process produces two, three-phase sources at the two sideband frequencies, either of which can be used as a variable-frequency supply for a three-phase a.c. machine.

Polyphase fixed frequency to provide a polyphase variable frequency

A polyphase voltage source can be converted to a polyphase source of variable frequency by modulating each phase by the same modulating wave. For example, if each phase of a three-phase supply is modulated by $\sin \omega_m t$, two three-phase sets at the sideband frequencies are produced, either of which can be used as a variable-frequency supply for a three-phase machine.

A polyphase fixed frequency to provide a polyphase variable frequency

A polyphase voltage source can be converted to a polyphase source of variable frequency by modulating each phase by one of a polyphase set of modulating waves. For example, a three-phase source, $$V_c \sin(\omega_c t),\ V_c \sin(\omega_c t - (2\pi/3))\ \text{and}\ V_c \sin(\omega_c t - (4\pi/3)),$$

modulated by waves $M \sin \omega_m t$, $M \sin(\omega_m t - (2\pi/3))$ and $\sin(\omega_m t - (4\pi/3))$, respectively, will produce a co-phasal set of waves at frequency $(\omega_c - \omega_m)$ and a three-phase set at frequency $(\omega_c + \omega_m)$, which latter can be used as a variable-frequency source for a three-phase a.c. machine.

Alternatively, a three-phase source, $V_c \sin(\omega_c t)$, $V_c \sin(\omega_c t - (2\pi/3))$ and $V_c \sin(\omega_c t - (4\pi/3))$ modulated by waves $M \sin \omega_m t$, $M \sin(\omega_m t - (4\pi/3))$ and $M \sin(\omega_m t - (2\pi/3))$, respectively, will produce a co-phasal set of waves at a frequency $(\omega_c + \omega_m)$ and a three-phase set at frequency $(\omega_c - \omega_m)$, which latter can be used as a variable frequency source for a three-phase a.c. machine.

Double Modulation

In the foregoing examples, it will be seen that the the products of the modulation process are two sidebands of frequency $(\omega_c - \omega_m)$ and $(\omega_c + \omega_m)$. If a second modulation procedure is introduced, where the second modulating wave is of frequency $\omega_c$, one of the products of this second modulation will be a sideband of the same frequency as the original modulating wave, of frequency $\omega_m$. Thus, $$V_c \sin \omega_c t \times M \sin \omega_m t \times \sin \omega_c t = M.V_c.\tfrac{1}{2} \sin \omega_m t + \tfrac{1}{2} \sin (2\omega_c - \omega_m)t - \tfrac{1}{2} \sin (2\omega_c + \omega_m)t$$

The preferred modulation process used according to the present invention is a double modulation process. The primary modulating process used is such that the secondary modulating wave may be a rectangular wave of frequency $\omega_c$, without introducing degradation of the sinusoidal waveform of the modulator output.

In the practical embodiments of apparatus disclosed herein, triacs are used as the controlling switch means whereby the sine-wave voltage supply carrier wave is modulated.

To obtain the required form of modulation, the amplitude of the primary modulating wave is sampled at the beginning of each single-phase supply voltage carrier wave half-cycle and the controlling triac is fired during that half-cycle at a time such that the volt-second integral of the voltage between the firing instant and the end of that carrier half-cycle is proportional to the sampled modulating wave voltage amplitude. A sample of the modulation voltage is thus obtained at every zero-crossing of the carrier voltage waveform and this is compared with a cosine timing wave. The crossing point of the sampled modulating voltage and the cosine timing wave indicates the moment of firing the triac.

When the modulatng wave of frequency $\omega_m$ becomes negative, it is necessary to effect a 180° phase-shift of the supply voltage carrier wave and this is conveniently effected by a bridge circuit arrangement. Double modulation is then conveniently effected by superimposing a square wave, of supply carrier wave frequency, upon the polarity signal determining the said phase-shift.

The modulation process described above relates to one modulated carrier wave and one modulating wave, that is to a signal-phase supply system. For a three-phase or a polyphase supply system, each output phase of the controlled variable-frequency supply is derived by a modulation process such as described above.

In order that the invention may be readily carried into practice, the modulation method of the invention and a practical embodiment of apparatus employing the said method will now be described in detail, the practical embodiment by way of example, with reference to the accompanying drawings, in which:

FIG. 5 is a block schematic diagram showing the overall double modulation process and apparatus; and FIG. 6 is a circuit diagram of apparatus for one phase of a three-phase or polyphase balanced modulator.

Figure 1:
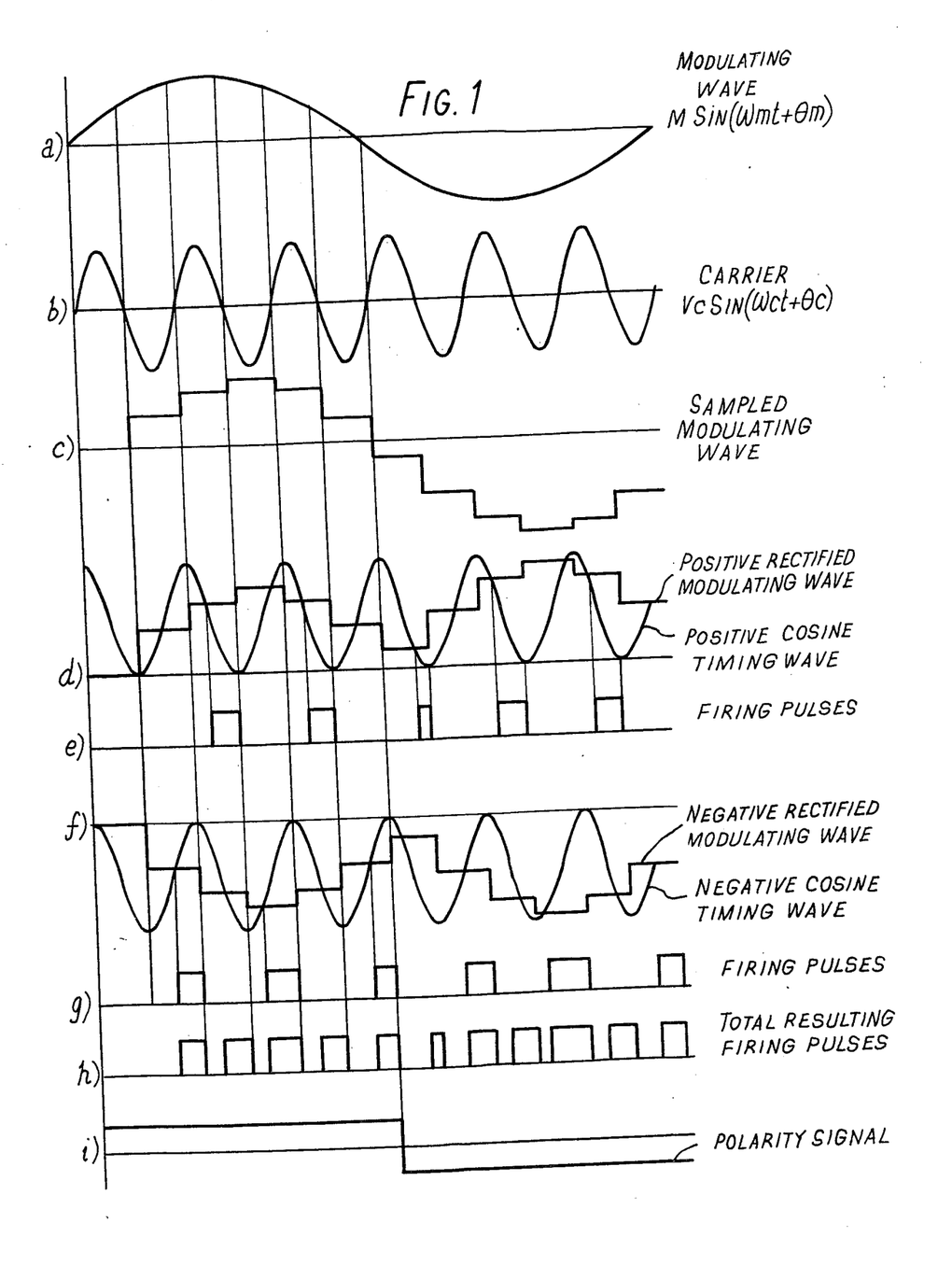
FIG. 1 comprising nine diagrams (a) to (i), shows the primary and secondary modulation process.
Figure 2A:
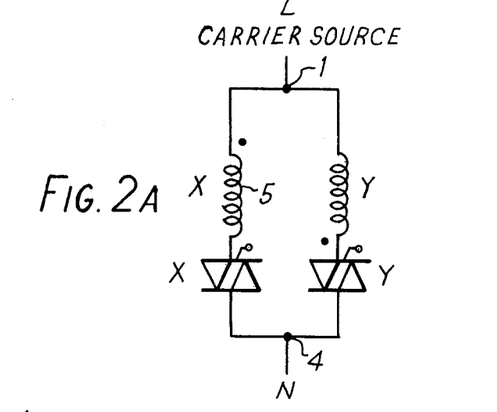
FIG. 2A is a circuit diagram of supply apparatus for a single-phase motor winding.
Figure 2B:
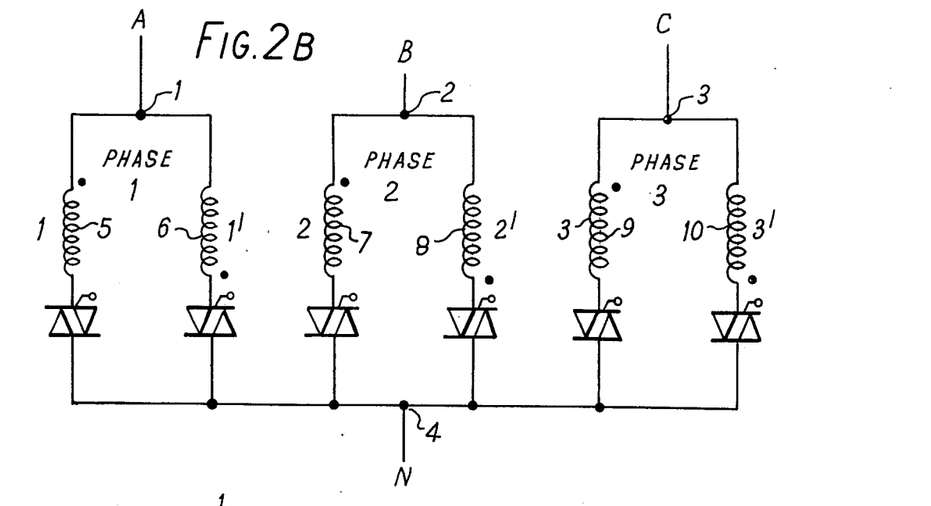
FIG. 2B is a corresponding circuit diagram for a three-phase supply.
Figure 3:
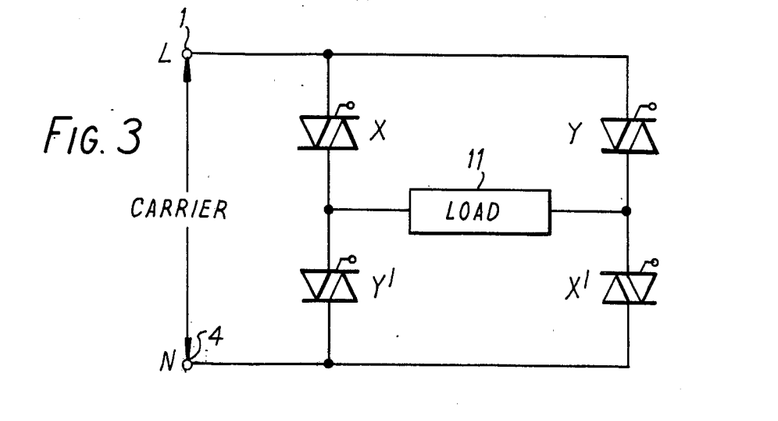
FIG. 3 is a circuit diagram of a bridge circuit modulator.

FIG. 1(b) shows a sinusoidal voltage wave of one phase of an alternating current supply, which serves as carrier wave $V_c \sin (\omega_c t + \theta_c)$ and appears between terminals 1 and 4 of the arrangement of FIG. 2A, FIG. 2B or FIG. 3.

FIG. 1(a) shows a sinusoidal modulating voltage wave $M \sin (\omega_m t + \theta_m)$ of frequency less than that of the carrier wave.

FIG. 1(c) is a stepped wave of sinusoidal form representing the instantaneous amplitudes of the true sinusoidal modulating wave of FIG. 1(a) at the zero-crossing instants of the carrier waveform of FIG. 1(b).

As shown in FIG. 1(d), the step sampled modulating waveform is compared with a cosine timing wave of the same frequency as the carrier wave of FIG. 1(b). The instants of equality of the stepped and timing waves, as represented by the crossing points of the two waves in the diagram of FIG. 1(d) are the instants when the control triacs of the circuit of FIG. 2A are fired.

During each negative half-cycle of the modulating wave, a 180° phase-shift, or reversal in polarity, of the carrier wave is required in order to make the comparison with the cosine timing wave.

Such phase-shift may be effected by the circuit arrangement of FIG. 2A, corresponding to one phase of FIG. 2B, or by the circuit arrangement of FIG. 3. Considering, first, the arrangement of FIG. 3, there is shown a bridge circuit having supply terminals 1 and 4, between which the carrier wave of FIG. 1(b) is applied and a load 11 which is connected serially with a pair of triacs X and X¹, or alternatively with a pair of triacs Y and Y¹, between the supply terminals 1 and 4. For one polarity of the carrier wave triacs X and X¹ are fired and for the other polarity of the carrier wave triacs Y and Y¹ are fired.

The alternative circuit arrangement of FIG. 2A uses alternative single triacs X and Y. Two motor windings energised in phase opposition are used one in series with each triac. Thus, in FIG. 2A, in the circuit of triac X, motor winding 5 is serially connected between terminal 1 and terminal 4, between which terminals the carrier wave is applied. In the circuit of triac Y, motor winding 6 is serially connected between terminals 1 and 4. Polarity reversal of the carrier wave is effected in this arrangement by conduction by way of triac X during one half-cycle, terminating conduction through branch X and firing triac Y at the next zero-crossing, and by conduction through branch Y during the opposite half-cycles. This arrangement means that only one-half of the motor windings are conducting at any instant.

Returning to FIG. 1, FIG. 1(d) shows the comparison of the positive rectified step modulating wave with the positive cosine timing wave. FIG. 1(e) shows the timing and duration of triac firing pulses which commence at an instant of equality of the step modulating wave and the cosine timing wave and extend to the next following zero-crossing of the carrier wave of FIG. 1(b), as shown by the vertical timing lines drawn through the waveforms of FIG. 1. FIG. 1(f) similarly shows the comparison of the negative rectified modulating wave with an equivalent negative cosine timing wave. FIG. 1(g) shows the timing and duration of the alternative triac firing pulses, which commence at an instant of equality of the negative step modulating wave and negative cosine timing wave and extend to the next following zero-crossing (in opposite sense) of the carrier wave of FIG. 1(b).

FIG. 1(h) shows the resultant triac firing pulses combining the pulses of FIG. 1(e) and the alternate pulses of FIG. 1(g). FIG. 1(i) shows the polarity-reversal rectangular wave effecting phase-shift of the carrier wave, as described.

Figure 4:
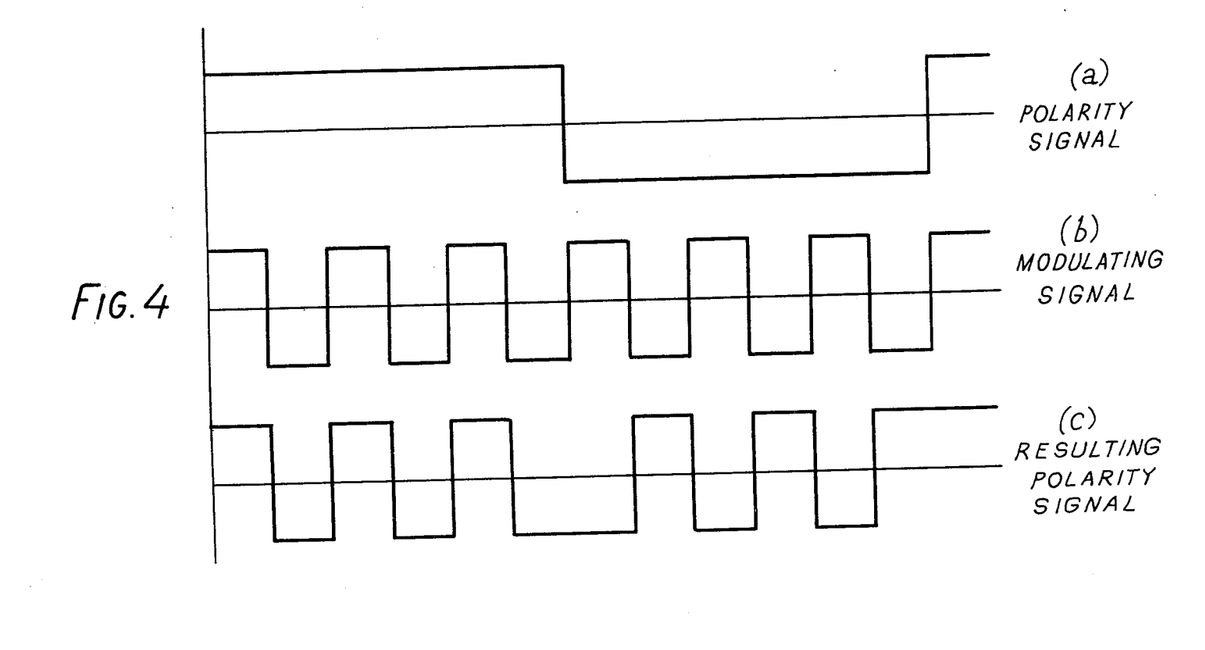
FIG. 4 comprises three wave diagrams (a) to (c) describing polarity signal modulation for the double modulation process.

Double modulation is now effected by superimposing a polarity-reversal rectangular wave, of carrier wave frequency, upon the polarity signal of FIG. 1(i). This process is shown in FIG. 4 where FIG. 4(a) shows the polarity signal of modulating wave frequency corresponding to the polarity signal of FIG. 1(i). FIG. 4(b) shows the secondary modulating rectangular wave of carrier wave frequency. FIG. 4(c) shows the resultant polarity signal due to the wave of FIG. 4(b) operating upon the wave of FIG. 4(a).

The foregoing description relates to a single-phase supply or one phase of a three-phase or polyphase supply. Returning to FIG. 2B, there is shown, for phase 1, the arrangement of FIG. 2A. For phase 2, a pair of motor windings 7 and 8 energised in phase opposition are similarly serially connected with a pair of alternately-fired triacs between supply terminals 2 and 4. For phase 3, similarly, a pair of motor windings 9 and 10 energised in phase opposition are serially connected with a pair of triacs between supply terminals 3 and 4. The arrangement thus requires a three-phase motor with six half phase-windings connected, by way of six triacs, in parallel-star arrangement.

A block schematic diagram for a practical embodiment of the required control apparatus, for either of the alternative triac power circuits described, for one phase of a supply, is shown in FIG. 5. The function of the various blocks is described and the waveform appearing is shown either by expression or by waveform. Thus, from an a.c. supply terminal 1 a sinusoidal voltage carrier wave of frequency sin $\omega_c t$ is supplied to a sample and hold circuit arrangement 12, to a phase-shift network 13 and to a secondary modulation circuit 14, if such is used. The carrier wave is as represented at FIG. 1(b). A variable-frequency oscillator 15 supplies a modulating wave also to the sample and hold circuit 12, this modulating wave corresponding to that of FIG. 1(a).

The sample and hold circuit 12 detects the zero-crossings of the carrier waveform and at each zero-crossing samples the instantaneous amplitude of the modulating wave. The circuit holds each sampled value until the next, thus producing the stepped sinusoidal wave of FIG. 1(c), which is fed to two rectifiers 16 and 17. Rectifier 16 provides a positive rectified output wave as shown in FIG. 1(d). Rectifier 17 provides a negative rectified output wave as shown in FIG. 1(f).

Phase shift network 13 supplies two sinewave outputs of opposite phase to two inputs of a cosine wave generator 18, the outputs from which unit are a positive cosine timing wave, of carrier wave frequency, as shown in FIG. 1(d) and a negative cosine timing wave of the same frequency, as shown in FIG. 1(f).

The positive step modulation wave from unit 16 and the positive cosine wave from the cosine generator 18 are together supplied to two inputs of a comparator 19, the output from which defines the firing pulses of FIG. 1(e). The negative step modulation wave from unit 17 and the negative cosine wave from cosine generator 18 are together supplied to two inputs of a comparator 20, the output from which defines the firing pulses of FIG. 1(g). The respective outputs of comparators 19 and 20 are combined in a pulse combination and gating circuit 21, to which is also supplied a sine wave of modulation frequency from the oscillator 15, from which is generated a rectangular wave polarity signal. The combined pulses are as shown in FIG. 1(h) and the polarity signal is as shown in FIG. 1(i) and FIG. 4(a).

The output of unit 21 is supplied to a polarity signal control unit 22. A sine wave of carrier frequency is supplied to the unit 14, as previously stated, and a rectangular wave of carrier frequency, as shown in FIG. 4(b) is also supplied to the unit 22. The output from unit 22, which defines either positive or negative resultant polarity, according to the wave of FIG. 4(c), is fed to an inhibition unit 23 together with a sinusoidal wave of carrier frequency derived from the supply. The output from unit 23 comprises the firing signals to the X branch or Y branch triacs, respectively, see FIG. 2A or FIG. 3.

A circuit diagram of the apparatus described with reference to the block diagram of FIG. 5 is shown in FIG. 6, in which diagram circuit elements are shown in component form or as logic or integrated circuit elements and the waveforms present are shown at all important points in the diagram.

It is again emphasised that the circuit arrangement of FIG. 5 and FIG. 6 are for a single phase only. The power supply circuits (A) and the pulse generator (B) of FIG. 6 alone serve for all phases of a 3-phase or polyphase system. Otherwise, the circuitry of FIG. 6 relates to one phase of a 3-phase or polyphase system and the circuitry is repeated for each other phase.

The circuitry of FIG. 6 is now described in terms of the function of its various units, corresponding generally to FIG. 5.

Sample and Hold Circuitry

A variable-frequency and variable-amplitude sinusoidal signal serving as the modulating wave and derived from a 3-phase signal generator, not shown, is fed to point 31. The signal is then subjected to a buffering process 32 which provides a low impedance supply for the charging of capacitor 37. Sampling pulses are generated by the single-phase full-wave rectifier 33 operating in conjunction with transistor 34, invertor 35 and transistor 36. The pulses are fed to a C MOS bi-directional switch 38, which gates the buffered signal onto capacitor 37 for the period of the sampling pulse. The voltage on capacitor 37 is fed through a further buffer 39 which effectively isolates capacitor 37 from any loading. This total process constitutes a sampling of the modulating signal fed at 31. The sampling process occurs in synchronism with the zero-crossings of the carrier fed into 32. This process is illustrated in FIGS. 1(a), 1(b) and 1(c).

Full wave rectification

The sampled modulating wave is passed to the invertor/rectifier arrangement shown at 40 which effectively full wave rectifies the input signal and produces two outputs of opposite polarity shown at 41 and 42. The two signals are fed to high gain differential amplifiers 43 and 44.

Comparison of cosine timing waves and rectified versions of the sampled modulation wave The cosine timing waves are derived from a combination of the remaining two carrier waves.

$$\text{Cos } A = \sin C - \sin B$$

and the process of combination is shown at 45. The cosine timing wave is buffered at 46 and passed to the two differential amplifiers 43 and 44 via d.c. isolating capacitors 47 and 48. A negative and positive d.c. bias is added at 49 and 50. The differential amplifiers then act as comparators as shown in FIGS. 1(d) and 1(e). When the amplitude of the rectified, sampled modulating wave is greater than the amplitude of the cosine timing wave for either comparator, the output of that comparator changes from negative to positive, thus the charge stored in capacitors 51 or 52 is delivered to the base emitter circuit of transistor 53, which then delivers a pulse corresponding with the presence of a positive-going edge at either comparator. The pulse is delivered as a logic signal to inverter 54 and flip-flop 55. The flip-flop is thus clocked whenever the amplitude of the rectified, sampled modulating wave exceeds in magnitude the cosine timing wave.

Inhibition of firing pulses

The inhibition signal is derived by comparing the full wave rectified carrier generated at 33 with a d.c. level, generated at 56, in comparator 57. The output of 57 is converted to a T.T.L. level signal by diode clamps 58 and 59. The positive going edge of this signal is used to trigger monostable 60. The resulting $\overline{Q}$ output is fed to NAND gates 61 and 62 in the pulse output lines, so that pulses are inhibited during the period of the monostable relaxation time.

The circuitry at 63 and 64 ensures that the flip-flop is reset at the beginning of each inhibition period and again just after all zero-crossings of the carrier wave. The flip-flop 55 is thus the central controlling element. The output of the flip-flop defines the period when the firing pulses may be delivered to the appropriate triac. The beginning of this period is when a pulse arrives from transistor 53, by way of invertor 54, and the end is when a reset pulse arrives from the inhibition logic. The triac firing pulses are generated by the pulse generator, which is common to all phases, comprising of unijunction oscillator 65 and monostable 66 and gated with the output of flip-flop 55 by NAND gate 67.

Polarity signal control

The pulses from NAND gate 67 are steered under the control of polarity signal 68 to the appropriate triac. The polarity signal is derived from the sampled version of the modulating wave out of buffer 39. Comparator 69 detects the polarity of the signal from buffer 39: diode 70 and zener diode 71 converts this signal to T.T.L. logic level. This signal is passed through exclusive OR gate 72, where it may be modulated, and to NAND gate 73 and, via invertor 74 to NAND gate 75. Invertors 76, 77, 78, 79 and 80 ensure that the firing pulses are delivered to the pulse amplifiers 81 and 82 with the correct polarity.

Double Modulation

The use of this circuitry is optional and its use is dependent upon the specific application of the system. This second modulation process is achieved by applying a square wave of carrier frequency, derived from carrier input at 33, to the exclusive OR gate 72. The square wave is generated by transistors 83 and 84 and invertor 85.

Inhibition schemes

It is essential to the operation of such a system that both triacs associated with a particular output phase do not conduct simultaneously. This can be achieved in one of two ways:

i. By firing inhibition near carrier zero-crossings

Inhibiting firing of the triacs during time intervals before and after the zero-crossing points of the carrier waveform prevents either triac from receiving a firing pulse at a time when the other triac has not yet turned off, as might otherwise occur when the load is inductive. Also, by this means the likelihood of the triac being fired when the back e.m.f. from a motor exceeds the supply voltage is reduced: this can often occur at low values of supply voltage, when the net volts are such as to drive current through the winding in the opposite direction to that which is required.

ii. By triac voltage and current detection

This method consists in detecting the current through, and the voltage across, each triac and ascertaining that these are correct before allowing the firing pulse to be applied to the triac to be turned on. This is accomplished by connecting the neutral of the carrier supply to the common of the firing circuitry and by incorporating voltage and current sensing elements with each triac.

In the specific embodiments of the invention described herein, triacs are used as the controlling switch means whereby the sine-wave voltage supply carrier wave is modulated. It will be understood by those skilled in the art that inverse parallel thyristor pairs may be substituted.

I claim:

1. A method for energising an alternating current motor, of induction motor or synchronous motor type, for controlling the running speed thereof in continuously-variable manner, deriving energising current from an alternating current supply of fixed supply frequency, comprising generating a sinusoidal modulating wave of continuously-variable frequency lower than the said supply frequency, sampling the amplitude of the said modulating wave once during each half cycle of the alternating current supply and deriving a stepwise alternating modulating wave of the same modulating wave frequency, deriving therefrom a full-wave rectified, stepwise varying modulating wave, comparing the instantaneous amplitudes of said rectified, stepwise varying modulating wave and a cosine wave of supply frequency and of equal maximum amplitude as said modulating wave and switching said energising current to flow solely during those intervals between equality of the two said waves and the next following zero amplitude time of the said cosine wave.

2. A method as claimed in claim 1 wherein said full-wave rectified, stepwise varying modulating wave deriving step comprises deriving from said stepwise alternating modulating wave both positive and negative, full-wave rectified, stepwise varying modulating waves, said comparing step comprises comparing the instantaneous amplitudes of said positive and negative modulating waves and positive and negative cosine waves, respectively, and said switching step comprises switching said energizing current to flow during the said intervals according to the said comparison of both pairs of the said positive and negative waves.

3. A method as claimed in claim 1, for energizing a three-phase alternating current motor, deriving energizing current from a three-phase alternating current supply of fixed supply frequency, wherein a sinusoidal modulating wave is generated, said stepwise alternating and rectified, stepwise varying modulation waves are derived, and the said instantaneous amplitudes are compared with those of each of a set of three-phase cosine waves of supply frequency and said energizing current of each phase of said three-phase supply is switched during the said intervals derived according to the corresponding cosine wave of said three-phase set.

4. A method as claimed in claim 1, for energizing a three-phase alternating current motor, deriving energizing current from a three-phase alternating current supply of fixed supply frequency, wherein a three-phase set of sinusoidal modulating waves is generated, three of said stepwise alternating and full-wave rectified stepwise varying waves are derived, one from each of said three-phase set of modulating waves, the said instantaneous amplitudes of each are separately compared with a corresponding one of a three-phase set of said cosine waves and said energizing current of each phase are switched to flow during the said intervals corresponding to the said phase.

5. A method as claimed in claim 1, in which the sampling step comprises sampling said sinusoidal modulating at the beginning of each supply sinusoidal wave half cycle.

6. A method as claimed in claim 5, in which said energising current is further switched in flow sense at the supply frequency.

7. Apparatus for performing a method for energizing an alternating current motor, of induction motor or synchronous motor type, for controlling the running speed thereof in a continuously variable manner, deriving energizing current from an alternating current supply of fixed supply frequency, said method comprising generating a sinusoidal modulating wave of continuously-variable frequency lower than the said supply frequency, sampling the amplitude of the said modulating wave once during each half cycle of the alternating current supply and deriving a stepwise alternating modulating wave of the same modulating frequency, deriving from said stepwise alternating modulating wave both positive and negative, full-wave rectified, stepwise varying modulating waves, comparing the instantaneous amplitudes of said positive and negative modulating waves with positive and negative cosine waves of supply frequency and of equal maximum amplitude as said modulating wave, and switching said energizing current to flow during those intervals where there is equality between the two waves and the next following zero amplitude time of the corresponding cosine wave according to the said comparison of both pairs of the said positive and negative waves, said apparatus comprising supply terminals for said alternating current supply; a sinusoidal modulating wave generator; amplitude sample and hold circuit means, having inputs from both said supply terminals and said modulating wave generator, for providing said stepwise alternating modulating wave output; positive and negative full-wave rectifiers for receiving said stepwise alternating modulating wave input and for providing, respectively, said positive and negative stepwise varying modulation waves, a pair of output lines, a cosine wave generator, having a sinusoidal wave of supply frequency as an input, for providing said positive and negative cosine waves on a pair of output lines, first and second comparators for comparing respectively the amplitudes of the positive and negative pairs of said modulation and cosine waves, and providing respective pulse outputs, on a pair of output lines, corresponding to the said intervals.

8. Apparatus as claimed in claim 7, further including pulse combination and gating means, having said pair of pulse output lines connected as a pair of inputs thereto together with an input sinusoidal wave of supply frequency and controlled phase, for providing a combined pulse output corresponding to said energising current flow intervals.

9. Apparatus as claimed in claim 8, further including square-wave forming means, having a sinusoidal wave of supply frequency input for providing a square wave of supply frequency output, polarity signal control means having said combined pulse output and square wave of supply frequency as inputs for providing as output said combined pulses modified in polarity according to said square wave polarity.

10. Apparatus as claimed in claim 9, further including inhibition circuit means, having as inputs said combined pulse output and a sinusoidal wave of supply frequency and controlled phase, for providing as output firing pulses for a pair of triacs controlling said energising current flow to the said motor.

* * * * *